（12) United States Patent
Gardner (10) Patent No.: US 6,370,135 B1
(45) Date of Patent: Apr. 9, 2002

(54) CONTINUOUS CDPD BASE STATION AND METHOD OF FACILITATING EFFICIENT DATA TRANSFER

(75) Inventor: Steven H. Gardner, San Diego, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 08/487,044

(22) Filed: Jun. 7, 1995

(51) Int. Cl.[7] ............................................... H04L 12/64
(52) U.S. Cl. ........................................ 370/352; 370/354
(58) Field of Search ........................... 370/60, 60.1, 79, 370/94.1, 94.2, 95.1, 95.3, 352–356

(56) References Cited

U.S. PATENT DOCUMENTS

| | | |
|---|---|---|
| 3,564,150 A | 2/1971 | Muller |
| 3,575,558 A | 4/1971 | Leyburn et al. |
| 3,627,955 A | 12/1971 | Stone, Jr. |
| 4,128,740 A | 12/1978 | Graziano |
| 4,301,531 A | 11/1981 | Lubin |
| 4,352,955 A | 10/1982 | Kai et al. |
| 4,654,867 A | 3/1987 | Labedz et al. |
| 4,661,972 A | 4/1987 | Kai |
| 4,730,187 A | 3/1988 | Menich et al. |
| 4,802,200 A | 1/1989 | Murata et al. |
| 4,812,843 A | 3/1989 | Champion, III et al. |
| 4,825,456 A | 4/1989 | Rosenberg |
| 4,941,200 A | 7/1990 | Leslie et al. |
| 4,947,420 A | 8/1990 | Stahl et al. |
| 5,001,742 A | 3/1991 | Wang |
| 5,020,091 A | 5/1991 | Krolopp et al. |
| 5,023,902 A | 6/1991 | Anderson et al. |
| 5,054,052 A | 10/1991 | Nonami |
| 5,115,514 A | 5/1992 | Leslie |
| 5,117,449 A | 5/1992 | Metroka et al. |
| 5,128,980 A | 7/1992 | Choi |
| 5,148,473 A | 9/1992 | Freeland et al. |
| 5,153,903 A | 10/1992 | Eastmond et al. |
| 5,166,973 A | 11/1992 | Hoff |
| 5,175,758 A | 12/1992 | Levanto et al. |
| 5,195,090 A | 3/1993 | Bolliger et al. |
| 5,202,912 A | 4/1993 | Breeden et al. |

(List continued on next page.)

FOREIGN PATENT DOCUMENTS

EP          0521610 A2      1/1993

OTHER PUBLICATIONS

Weber, "PCs On the Go Are Causing a Burst of Activity", Electronic Engineering Times, Mar. 29, 1993.
2,063,901, Application for Canadian Patent for : Cellular Data Overlay System, Inventors, Slekys, Arunas G. et al., Sep. 26, 1992.

Primary Examiner—Melvin Marcelo
(74) Attorney, Agent, or Firm—Skjerven Morrill MacPherson LLP (57) ABSTRACT

A multi-mode communication system, including controller, base stations and subscriber stations, where the communication system has the capability of operating either in a packet-switched mode or a circuit-switched mode. The packet-switched mode of operation complies with the existing Cellular Digital Packet Data (CDPD) standard with respect to modulation and higher level protocol, and is designated continuous CDPD mode. This mode of operation is highly cost effective for transfers of relatively small amounts of data. For larger data transfers, the more cost-effective continuous CDPD mode is used. Thus, using this mode, the system is capable of providing superior data rate performance over a vastly greater coverage area than existing circuit-switched modems. Requests for access to continuous CDPD channels are initiated at subscriber stations. This initiation can result from manual intervention by the user of the subscriber station, or can be automatic in response to the amount of data to be transferred, as well as comprising structure for each mode of data transfer used by the service provider.

42 Claims, 5 Drawing Sheets

U.S. PATENT DOCUMENTS

| | | |
|---|---|---|
| 5,228,074 A | 7/1993 | Mizikovsky |
| 5,241,537 A | 8/1993 | Gulliford et al. |
| 5,247,700 A | 9/1993 | Wohl et al. |
| 5,282,204 A * | 1/1994 | Shpancer et al. .......... 370/94.2 |
| 5,345,597 A | 9/1994 | Strawczyaski et al. |
| 5,365,512 A | 11/1994 | Combs et al. |
| 5,365,524 A | 11/1994 | Hiller et al. |
| 5,384,777 A * | 1/1995 | Ahmadi et al. ............ 370/85.2 |
| 5,483,524 A * | 1/1996 | Lev et al. .................. 370/60.1 |
| 5,533,019 A * | 7/1996 | Jayapalan .................. 370/60.1 |
| 5,533,029 A * | 7/1996 | Gardner ..................... 370/94.1 |
| 5,544,222 A * | 8/1996 | Robinson et al. ............. 379/58 |
| H1641 H * | 4/1997 | Sharman ....................... 379/60 |

\* cited by examiner

CONTINUOUS CDPD BASE STATION AND METHOD OF FACILITATING EFFICIENT DATA TRANSFER

TECHNICAL FIELD

This invention relates generally to wireless data communication systems. More particularly, the invention relates to mobile data base stations supporting transmission and reception of data in multiple modes.

BACKGROUND ART

The modern analog cellular system for mobile wireless duplex voice transmission is called "Advanced Mobile Phone Service" (AMPS). The AMPS cellular network uses the FCC assigned carrier frequency range of 800 to 900 MHz. Automobile-mounted cellular units transmit voice signals to a cellular base station within a given cell using up to one watt of power. Hand-held cellular units using battery power supplies transmit voice signals to a cellular base station within a given cell using up to one quarter watt of transmission power.

The analog human voice was the signal that the AMPS system was first designed to communicate. The AMPS system has been optimized for carrying as many analog voice signals within a given bandwidth of a channel as possible. Mobility of the cellular telephone using low power mobile units, FM modulation, and the higher carrier frequency range (800 MHz–900 MHz) is achieved through a cellular arrangement of base stations whereby a user's signal is handed off to the next cell site as he or she moves into a different cell area. This cellular hand-off can cause a temporary loss in transmission or reception. Temporarily losing a voice signal is not critical because a user knows when there is a signal loss and the voice information can be retransmitted. However, signal loss, even though temporary, poses special problems for transmission of digital data. Some other AMPS cellular problems causing loss in voice signals are drops in signal strength, reflections, Rayleigh fading, and cellular dead spots.

The availability of portable computers naturally results in the desire to conduct wireless transmission of digital data from a remote location. Presently, the AMPS voice cellular system is being used to transmit digital data in the form of circuit-switched cellular data across AMPS carrier channels. Raw (baseband) digital data must be converted so that it can be transmitted and received across the analog AMPS system. One disadvantage to using the AMPS system for data transmission is that a narrow channel bandwidth and errors in transmission limit the baud rate for transmitting and receiving the digital data. As previously stated, loss of raw digital data may be caused by other problems in the AMPS mobile cellular system.

In the circuit-switched mode of data communication, a single channel is set aside for specific communication, and is dedicated thereto until that communication is complete. When sending data in a conventional cellular circuit-switched mode, a modem creates a waveform from the data in a manner similar to that of a wireline modem. The modem combines amplitude and phase modulation to create modulation based upon multiple bits per symbol. The resulting modulated signal is then transmitted over the cellular voice channel in the same way that it would be sent over a wireline connection, i.e., as an audio signal. The modulation constellations used for cellular modems are, although similar, generally simpler than that used for their wireline counterparts. However, they are somewhat similar. Consequently, the modulated circuit-switched cellular signals are particularly vulnerable to the sort of degradations that occur on a normal cellular voice channel which is far noisier than a typical wireline voice channel.

In general, performance of cellular circuit-switched modems is quite poor as soon as the signal strength becomes relatively low or the interference level becomes high. For example, while the sensitivity of the cellular voice receiver is about −103 dBm in a fading channel, the circuit-switched connection begins to degrade at about −80 dBm. Normally, such degradation can be overcome by shifting the bit rate downwards. However, even at 4.8 kbps, it is difficult to maintain a reliable connection when the signal level dips below −90 dBm. Even at high signal levels in the cellular circuit-switched arrangement, it is rare to be able to achieve more than 14.4 kbps data rate.

In addition, the performance of the circuit-switched modem is impacted by the nature of the backhaul as well as the nature of the airlink. The backhaul can cause severe echo problems that necessitate good echo cancellation techniques requiring complex circuitry resulting in increased costs and additional station space. Thus, conventional circuit-switched AMPS data transmission is expensive as well as risky.

Another problem of data transmission with a mobile subscriber station occurs when a subscriber station is moving at the edge of a cell or coverage area. Such circumstances can result in a substantial loss of data, or substantial delays due to the necessity of re-transmitting the data. These problems have been addressed in part by the Cellular Digital Packet Data (CDPD) system described in the CDPD specification, Version 1.1, incorporated herein as background information. The CDPD communication system shares the same carrier frequencies assigned to the AMPS channels as indicated in the CDPD specification.

Figure 1:
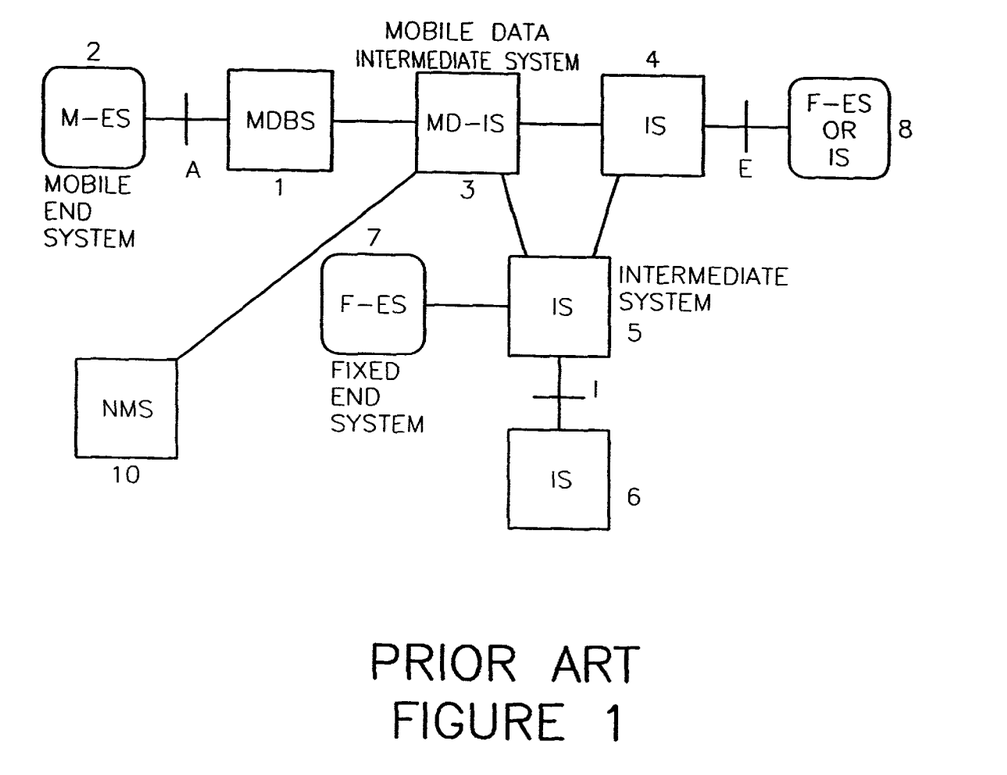
FIG. 1 is a block diagram of a CDPD system.

The base unit or mobile data base station (MDBS 1, as illustrated in FIG. 1), of an exemplary CDPD system utilizes a channel within an AMPS cell to establish a link and communicate to a user's mobile end system. The MDBS may use other frequencies outside of AMPS that are made available to it by service providers. The mobile end system or subscriber station (M-ES 2) is a portable computer, hand-set or other portable electronic device containing a subscriber communication unit. The MDBS serves as a communication link between the user of the M-ES 2 and a service provider's network of wire lines, microwave links, satellite links, AMPS cellular links, or other CDPD links (such as mobile data intermediate system MD-IS 3, intermediate systems 4, 5, 6) to convey data to another mobile end system, computer network, or non-mobile or fixed end-user system (F-ES 7, 8).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 2 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD transmitter/receiver in a particular sector (transmitting range and area of a standard AMPS base station transceiver).

The airlink interface portion of the CDPD network consists of a set of cells. A cell is defined by the geographical boundaries within which the RF transmission between an M-ES and an MDBS are received at acceptable levels of signal strength. It is not sufficient that the subscriber receive an adequate signal level. The base station must also receive a good signal from the subscriber station (M-ES) for the subscriber to be considered within the cell. The transmitter supporting the cell may be located centrally within the cell, with transmission being carried out via an omni-directional antenna, or the transmitter located at the edge of a cell and transmission carried out via a directional antenna. This second type of cell is also referred to as a sector. In typical configurations, the transmitters for several sectors are co-located. The area served by a set of cells has some area overlap, so that a moving mobile end system can maintain continuous service by switching from one cell to an adjacent cell in a manner roughly analogous to the standard hand-off in an AMPS system. The two cells are considered to be adjacent if an M-ES can maintain continuous service by switching from one cell to the other. This switching process, called cell transfer, is done independently of normal AMPS hand-off procedures.

In FIG. 1, the interface (A) between the mobile end system 2 and the MDBS 1 is an "air interface" constituted by a radio frequency link using standard AMPS frequencies. The MDBS 1 is connected to other mobile data base stations through various public and private data networks. One example is mobile data intermediate system (MD-IS) 3. A number of mobile data base stations can be under the control of a single mobile data intermediate system. The mobile data intermediate systems are connected to each other through intermediate systems such as 4 and 5 in FIG. 1.

The intermediate systems are constituted by at least one node connected to more than one sub-network (such as intermediate system MD-IS 3). The intermediate system has a primary role of forwarding data from one sub-network to another. The mobile data MD-IS 3 performs data packet routing based on knowledge of the current location of each mobile end system within the range of the mobile data base stations under the control of the MD-IS. The MD-IS is usually the only network entity that is "aware" of the location of any of the mobile end systems. However, under some circumstances (as defined by the CDPD specification) particular mobile database stations will keep track of the behavior of specific subscriber stations. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol, programming instructions can be transmitted from the NMS 10 through the MD-IS 3 to any number of mobile data base stations under the proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. The functions and protocol as carried out by each of the mobile end systems and the mobile data base station are explained in greater detail in the CDPD specification, Parts 402 and 403.

Figure 2:
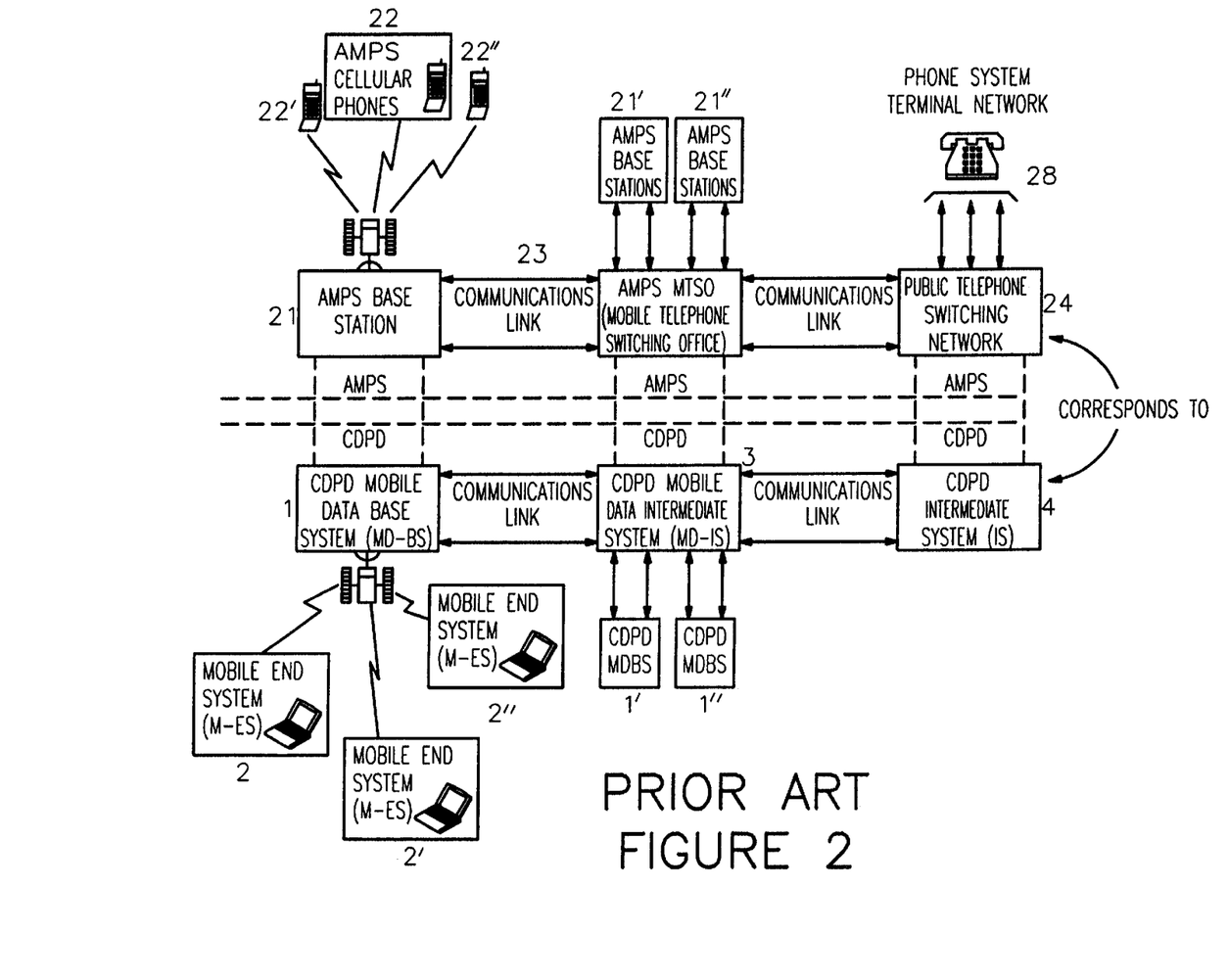
FIG. 2 is a block diagram correlating the CDPD system to an AMPS system.

FIG. 2 provides a comparison between the CDPD network illustrated in FIG. 1 and the standard AMPS network. The MDBS 1 is the CDPD equivalent to an AMPS base station 21. Both serve as links to mobile users, 2, 2', and 2" for the CDPD system and 22, 22' and 22" for AMPS users. Also, the MDBS 1 is preferably located with the AMPS base station 21.

The MD-IS 3 which acts as a local controller for the CDPD mobile data base stations connected thereto is equivalent to the mobile telephone switch office (MTSO) 23 used to control a plurality of AMPS base stations 21, 21' and 21". In the AMPS system, the MTSO 23 can be connected to the various base stations 21, 21', 21" by way of communication links, either over dedicated landlines or through a Public Switched Telephone Network (PSTN). Likewise, the connection between MD-IS 3 and the various mobile data base stations 1, 1', 1" controlled thereby is made in the same manner. However, different signaling protocols are used than those found in the AMPS system.

In comparison to AMPS, the infra-structure requirements of CDPD are very small. The CDPD base station equipment is located (preferably) at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS of the CDPD system do not have to be co-located in order to share RF links. In the AMPS system, the MTSO 23 has the responsibility of connecting the AMPS base station and the mobile station to another party 28 through a PSTN 24. The intermediate system 4 of the CDPD roughly corresponds to the use of the PSTN by the AMPS system. Like the AMPS system, the CDPD system must also use the public switch telephone network or another landline network for completing calls to remote parties or systems via a phone system terminal network 28. However, the CDPD system employs a different protocol than that used by the AMPS system for completing calls over a PSTN.

In general, the CDPD system illustrated in FIG. 1 operates to provide service to manage data communications to subscribers over a wide geographic range. When a mobile end system or subscriber station is located, data packets are routed directly to and from it by the MD-IS via the MDBS. The route via which data packets are forwarded to and from a mobile end system or subscriber station changes when the mobile end system moves.

The MDBS maintains zero or more (up to the MDBS transmission capability) channel streams across the airlink interface, as directed by the MD-IS controlling that MDBS. The MDBS instructs all subscriber units to change channels when necessary such as when an AMPS communication is detected on the CDPD channel. Each subscriber station's terminal stream is carried on one channel stream at a time, normally selected by the mobile subscriber, preferably based upon data received from the MDBS regarding optimum channels for CDPD use. The forward and reverse traffic in a given cell (the terminal stream or the MDBS) is carried on a single DS0 trunk, between the MDBS and the MD-IS. Communication between the MDBS and the MD-IS over the DS0 trunk follows standard formats such as T1.

Within the CDPD network, digital data is transmitted between the MDBS and the M-ES using Gaussian Minimum Shift Keying (GMSK) modulation. Transmission from the base station to the subscriber station M-ES are continuous. Transmissions from subscriber station M-ES to the MDBS use a burst mode in which subscriber station M-ES only accesses a channel when it has data to send and the channel is not being used by other mobile subscriber stations. This allows a multiple mobile subscriber stations to share a single channel, and for data transmission characterized by intermittent transactions of relatively small amounts of data, thereby greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and very good error performance in cellular channels. The fact that the choice of modulation was not constrained by a pre-existing signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently the raw (baseband) digital data being transferred across CDPD include electronic mail messages, digital fax data, or digital data representing a network connection such that files may be transferred as if currently connected to a local area network.

The MD-IS handles the routing of packets for all visiting mobile end systems in its serving area. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and to detect the onset of voice traffic on the channel currently being used for CDPD communication. If an AMPS cellular unit begins transmitting on a channel occupied by a CDPD communication, the CDPD unit ceases transmitting on that channel and switches to another available channel, or if no other channel is available, ceases transmission until a channel becomes available for CDPD use. This is referred to as channel hopping.

Although the CDPD system shares existing AMPS radio frequency channels, as stated above, AMPS calls are given first priority, and they are always able to pre-empt the use of any channel being used by CDPD. However, the cellular service provider may opt to dedicate one or more channels to CDPD usage. In this case, AMPS calls will never attempt to pre-empt the particular channels dedicated to CDPD use.

In a normal operation of the MDBS carrying out channel hopping, the MDBS monitors activity on AMPS channels. The MDBS maintains a list of the status (occupied voice or unused) for each channel available for CDPD use at the cell. The MDBS selects a channel for CDPD use from the unused channels in the list based on a combination of criteria (not specified in the CDPD standard). These could include such considerations as: the likelihood that the channel will be required by the voice system in the near future; the amount of interference present on the channel; the amount of interference that the CDPD communication is likely to cause to other voice users in different cells, or on other sectors; or, other factors. The MDBS transmits a list of all channels available for CDPD use (whether currently occupied by a voice communication or not) to the subscriber stations. The MDBS may execute a channel hop before the channel is pre-empted by AMPS communication if the MDBS determines that another channel is more suitable. In such a case, the MDBS sends a message to the subscriber stations commanding them to change to the specific channel selected, and then the MDBS executes the hop. This sort of hop is much more orderly and efficient since the subscriber stations do not have to search for the next channel.

If the present CDPD channel is pre-empted by AMPS communication, the MDBS selects another channel from those unused by AMPS communications and immediately hops to it without informing the subscriber station. The subscriber station then determines that the CDPD signal is no longer present on the current channel and searches the other channels in the list to determine the channel (if any) to which the CDPD communication has hopped.

The CDPD system has the capability of easily interfacing with the existing AMPS system and sharing some front-end equipment with it. To take advantage of this capability the MDBS must have the capability of physically interfacing with existing AMPS base stations. Consequently, the MDBS should be small, non-obtrusive, and easily accessible without interrupting existing AMPS equipment. The MDBS has to be configured so as to easily be connectable to equipment outside the MDBS normally shared with the AMPS system. This external equipment found in the AMPS base station includes an antenna system; RF power amplifiers (in particular, linear amplifiers can be shared with existing AMPS), RF multicouplers; power splitters; duplexers; and, optional equipment. Since the MDBS shares the environment of the AMPS base station, the MDBS should not constitute a substantial additional burden upon such support systems as environmental control and maintenance. Thus, the MDBS must be compact and flexible, constituting only those elements necessary for carrying out the MDBS functions necessary at that cell site.

As previously described, CDPD systems use packet-switched transmission. However, there are a number of disadvantages to using the packet-switched mode as opposed to the circuit-switched mode. The first disadvantage is economical while the second is a relatively low effective bit rate in the packet-switched mode.

The first disadvantage is based upon the fact that many system carriers will charge for CDPD service on a per-packet basis. On the other hand, circuit-switched service is charged based upon connection time. Thus, under certain conditions, it is economically more advantageous to use the circuit-switched service than the packet-switched service. For example, assuming that a circuit-switched rate is 40 cents per minute (a common rate in the industry) and charges occur for one minute increments, then the least expensive circuit-switched connection will cost 40 cents. Assuming that the CDPD rate is 5 cents per packet (a common rate in the industry), then the CDPD rate is less expensive until more than eight packets worth of data must be sent in a single transaction. Consequently, when large numbers of packets must be sent, it is more economical to use the circuit-switched mode of data transmission rather than the packet-switched mode.

The second disadvantage of using the packet-switched transmission mode resides in the number of data packets from many different subscribers to be found in a data stream. This slows the overall communication of any one subscriber. Further, the extensive overhead necessary to maintain packet-switched transmissions is not required for the circuit-switched mode of transmission. Both of these factors could result in a much lower effective bit rate, and slower communications for individual subscriber stations.

Therefore, the most desirable situation would result from a system that is capable of maintaining a circuit-switched mode of data transmission as reliable as the CDPD data packet-switched mode. Such a system would also have the capability of switching between the packet-switched mode and the circuit-switched data transmission mode at appropriate times. Conventional cellular systems fail to provide these capabilities.

BRIEF SUMMARY OF THE INVENTION

An advantage of the present invention is to facilitate the use of a CDPD Mobile Data Base Station (MDBS) with existing Advanced Mobile Phone Service (AMPS) facilities.

A further advantage of the invention is to facilitate economical data transmission.

An additional advantage of the invention is to decrease transmission time of a data communication over a cellular telephone system.

Still another advantage of the invention is to increase the probability of cellular data transmission completion.

Yet an additional object of the invention is to determine the most favorable mode of cellular data transmission under a particular set of operating conditions.

These and other advantages of the invention are achieved by a communication system arranged to facilitate efficient data transmission where the communication system is constituted by a CDPD. The CDPD portion is arranged to facilitate communication for a plurality of wireless subscriber stations using a plurality of Mobile Data Base Stations (MDBS) controlled by at least one Mobile Data Intermediate Section (MD-IS). The system further includes a continuous CDPD data portion or continuous CDPD portion distributed over a plurality of CDPD MDBS's, as well as means for a subscriber station to request conversion of a particular data transmission from the CDPD packet-switched portion to the continuous CDPD data portion. The system further includes means for allocating a continuous CDPD data channel for the particular data transmission for which conversion has been requested.

In accord with a second aspect of the invention a method of efficient data transmission in a communication system includes a CDPD packet-switched portion. The CDPD packet-switched portion is arranged to facilitate communication with a plurality of wireless subscriber stations using a plurality of MDBS controlled by a MD-IS. The method of operating the aforementioned system comprises the steps of designating, at the request of the subscriber station using the packet switched mode of CDPD operation, at least one unused channel that has been designated as available for CDPD use as a continuous CDPD channel that is not subject to use by CDPD packet-switched transmissions. In the next step, transferring the particular data transmission requesting subscriber station to the designated continuous CDPD channel and carrying out the particular data transmission in the continuous CDPD mode.

In another aspect of the invention, the aforementioned objects are achieved using a CDPD MDBS comprising a plurality of transceiver cards supporting CDPD communication. At least one of the transceiver cards is allocated to continuous CDPD communication and is not subject to use by CDPD packet-switched mode transmissions. There are also means for assigning data communications to a transmission card allocated for a continuous CDPD data communication.

Yet another aspect of the invention is directed to a portable wireless subscriber station with means for requesting operation in a CDPD packet-switched mode. The subscriber station includes means for requesting that the base station assigns a channel for continuous CDPD transmission, as well as means for selecting between the two means for requesting operation mode.

BEST MODE FOR CARRYING OUT THE INVENTION

Improved operation for data transmission in the circuit-switched mode, as well as appropriate switching between the packet-switched mode, and circuit-switched mode can be facilitated by a modification to existing CDPD mobile data base stations as disclosed in U.S. patent application Ser. No. 08/152,005 now U.S. Pat. No. 5,544,222. It is also necessary to modify the software of subscriber stations supporting CDPD operation, as those disclosed in U.S. patent application Ser. No. 08/117,913.

The drawback of circuit-switched data transmission described with respect to the conventional art are avoided by the modulation technique used in CDPD systems. As described in Part 408–32 of the CDPD specification, the RF signal has a constant envelope, and the phase varies in a continuous manner (continuous phase modulation). The modulation type is Gaussian Minimum Shift Keying (GMSK), with a modulation index of 0.50. The BT product of the modulation is 0.5. The tolerance of the modulation index is 1% or less. The data rate is 19,200 bps with an accuracy of ten parts per million. The Continuous Phase Modulation (CPM) is described by the equation at 408–32 of the CDPD specification, Version 1.1, incorporated herein as background material. A further dissertation on digital phase modulation is found in the text entitled "Digital Phase Modulation" by J. B. Anderson, T. Aulin and C. Sundberg, published by the Plenum Press, 1986, and incorporated herein by reference as background material.

When circuit-switched data transmission uses the aforementioned CDPD modulation, and higher level protocols (as indicated in the CDPD specification) this mode of operation is designated continuous CDPD. The same channel bit rate of 19.2 kbps is available for continuous CDPD transmission as for packet-switched transmission. Because of overhead due to status and synchronization bits and FEC coding, the bit rate available to the user for either mode of transmission is somewhat less than 19.2 kbps. In the preferred embodiment of this invention, the continuous CDPD mode uses the same GMSK modulation and 19.2 kbps channel bit rate as packet mode CDPD. This is done while employing a (63,55) Reed Solomon code for FEC, 70 code status flags without busy/idle flags, and a 15 bit sync word for each block. In this case, the usable bit rate is 15.84 kbps. However, the receiver sensitivity performance will be comparable to that of standard analog cellular voice receivers, which is far better than existing cellular modems operating at comparable bit rates.

It should be noted that while in the preferred embodiment of the invention, the modulation technique is the same for the continuous CDPD mode as that used for packet-switched CDPD, the modulation does not have to be identical. It is a simple matter to generate other modulation types with comparable performance. Examples of such modulation types include, but are not limited to: FSK; CPFSK; MSK; GMSK with other BT products or modulation indices; LRC; LSRC; Tamed FM; or variance of QPSK, including π/4—shifted DQPSK. In many modern architectures, it is a simple matter of signal processor programming to implement a different modulation technique. Consequently, the exemplary modulation technique should not be construed as a limitation on the invention.

In most situations, performance is limited by the reverse channel (transmission from the mobile end user to the MDBS) because the mobile unit or end user station has much less transmission power than that of the base station. Consequently, sophisticated techniques have been developed for receiving the CDPD signal at the base station so that the base station receiver sensitivity can be as low as −110 dBm in a Rayleigh faded mobile channel. This is a 30 dB improvement compared to existing cellular circuit-switched arrangements operating at comparable bit rates. In a typical cellular environment where the path loss varies as forty times the log of the distance, this corresponds in an increase in the distance at which signal strength is acceptable by nearly a factor of six. Thus, the coverage area is increased by a factor of nearly thirty-two.

This vast improvement in performance makes high performance circuit-switched cellular communication possible with coverage performance comparable to cellular voice communication, within the context of the CDPD system. This can be accomplished by replicating existing hardware in the base station and by modifying the base station and subscriber station software. This is accomplished by a minor hardware addition in the MDBS, and a software modification to both the MDBS and the subscriber stations. Optionally, a software modification can be made to the Mobile Data Intermediate System (MD-IS) to carry out an additional embodiment of the invention.

Figure 3:
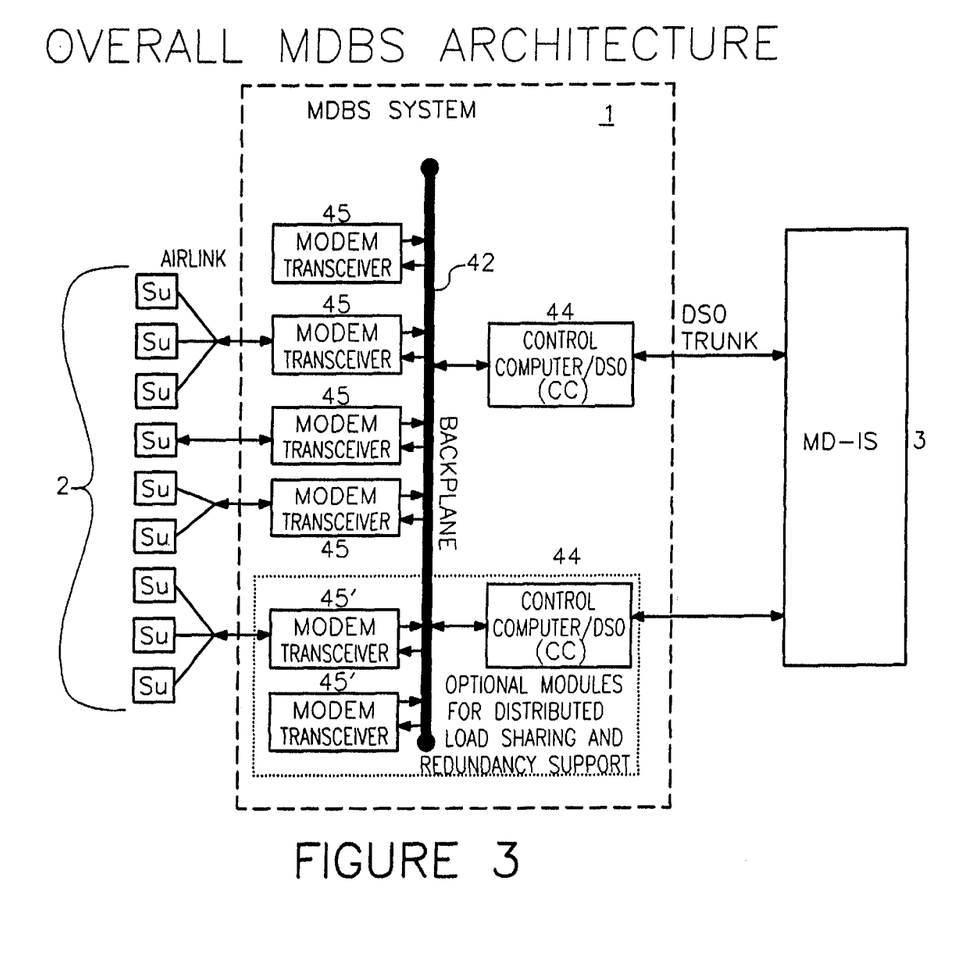
FIG. 3 is a block diagram of the overall CDPD mobile data base station architecture.

The hardware modification is illustrated in FIG. 3 depicting the overall MDBS architecture. A key feature of the MDBS architecture is the backplane constituted by a serial bus used to connect the control computer modules 44 to various sniffer/modem/transceiver (SNODEM) module 45 and 45'. A power converter module (not shown) is also connected to the rest of the system through the backplane 42. Each of the control computer boards 44 is connected to the MD-IS 3 (in FIG. 1) through a DSO trunk. The forward and reverse traffic of several RF channels can be carried on a single DSO trunk between the MDBS and the MD-IS. It is the function of the MD-IS to reassign all subscriber units supported on a given DSO trunk before deactivating that trunk.

SNODEM module 45 are normally required to service all the CDPD data transmission functions required of the MDBS. These SNODEM module are controlled by a controller 44, which is backed up by a second or redundant slave controller (not shown). In the preferred embodiment of the invention, SNODEM module 45' are dedicated to circuit-switched data transmissions. These SNODEM modules 45' are added to the MDBS, in addition to the modules as used for normal CDPD packet-switched transmission requirements.

RF channels used for circuit-switched data transmission are not subject to competition for data stream space from other packet-switched data transmissions, as is the case with CDPD packet-switched channels. This makes it possible to remove the overhead required to support access to the channel by multiple subscribers, allowing a substantially higher user bit rate than is possible for packet-switched CDPD. Data packets from other users are not inserted into the dedicated data stream of a continuous CDPD transmission. Further, since there is no need to identify each packet in a data stream dedicated to a single transmission, there is far less overhead space used for identification and sorting purposes. Thus, a reverse channel data rate of approximately twice that available to a packet-switched transmission is available to the subject continuous CDPD transmission.

As previously discussed, the CDPD mode of modulation results in a circuit-switched transmission operating at receiver sensitivity comparable to that of packet-switched transmissions. In addition, if all the other factors are equal, it is generally easier to achieve good performance in a continuous mode of reception than in a burst mode. Thus, the circuit-switched performance using the CDPD modulation will actually exceed that of packet-switched CDPD by a small amount. As a consequence, CDPD circuit-switched data transmissions are actually slightly more reliable than CDPD packet-switched transmissions, in addition to being substantially faster.

A fully populated MDBS transceiver bank can house up to two control computer modules 44, six SNODEM modules 45, and two power converter modules (not shown). Only one control computer module is actually required in a functioning MDBS. The second control computer is a redundant module provided to improve reliability. The second power converter module is also present for reliability purposes. The SNODEM modules can be installed as required to meet the requirements based upon the number of sectors to be supported by the base station, as well as the number of RF channel streams to be supported per sector (each SNODEM supports one RF channel stream). Another factor is the level of reliability desired by adding redundant modules. If six SNODEM modules are insufficient for the needs of a given cell, additional chassis with more SNODEM modules may be added (up to a maximum of nine chassis). The allocation and functionality of each SNODEM can be controlled via instructions transmitted from a network manager over the DSO trunk to the control computer module, or locally using a utility port.

A SNODEM module identical to that used for packet-switched CDPD can also be used to support the continuous CDPD mode. Such a SNODEM is installed in a spare SNODEM module slot in the existing chassis. Also, another chassis can be added if no spare slots remain. Software implementing the circuit-switched mode is downloaded to each SNODEM supporting circuit-switched operation instead of the normal packet mode software. As an additional feature of the invention, one software package can implement both modes with either packet-switched mode or circuit-switched mode being selected under control of the control computer via instructions from the network manager or utility port. Data transfer between the control computer and the SNODEMS assigned to circuit-switched operation occurs in the same fashion as data transfer between the control computer and the SNODEMS assigned to packet-switched operation.

Because of the aforementioned structural arrangement, channel capacity can be expanded up to nine chassis (each with a full complement of SNODEM module), yielding a total of 54 simultaneous channel pairs for a single CDPD-MDBS. Further expansion to the CDPD channel capacity is possible by covering the sectors (as defined by AMPS antenna coverage) with logically separate local mobile data base stations. In the same manner, additional dedicated, circuit-switched SNODEM module 45' can be added along with the expansion of the MDBS.

Each of the SNODEM module 45, 45' accommodates two receive RF port connectors, and an RF sniffer port connector. This connector provides an input to the RF sniffer for a coupled sample of the AMPS transmitter output for the sector used by the CDPD channel, allowing the SNODEM to determine which of the channels in the list of channels available for CDPD use are occupied by cellular voice traffic at any given time.

The use of additional sniffers to check for both the least likely channels for AMPS communications and co-channel interference on candidate channels for circuit-switched transmission is especially useful with SNODEMS dedicated to continuous CDPD channels, because unplanned hops triggered by pre-emption of the channel for AMPS voice communications may require that the subscriber return to the packet-switched mode and request another channel. Thus, it is desirable to maximize the use of planned hops and reduce the number of unplanned hops to the greatest extent possible.

The circuit-switched SNODEM module 45' may either use a dedicated channel, or it can be assigned a channel by the MD-IS 3 (in FIG. 1) which negotiates for a channel with accompanying AMPS equipment. In the alternative, as previously indicated, the SNODEM module 45 assigned to circuit-switched operation, can use its RF sniffer to scan among available channels (for CDPD use) in a manner similar to the channel hopping sequence described in the CDPD specification. Both planned and forced channel hops can be carried out in accordance with the CDPD specification.

There are two types of channel hops that can occur in either the circuit-switched or packet-switched modes of operation. Forced hops occur when an AMPS voice channel becomes active on a channel being used by CDPD data transmission. In this case, the CDPD base station immediately ceases transmission on that channel, and switches to another available channel without voice activity. In this case, the subscribers must detect the loss of the CDPD signal on the original channel and then search for the new channel.

Planned hops occur when the MDBS determines that another channel is preferable despite the fact that no AMPS voice activity has been detected on the current channel. This preference may be based on any number of factors, including the level of interference present on the channels, or the likelihood that the AMPS equipment will select the current channel for a voice call in the near future. In a planned hop, the MDBS sends a message directing the subscribers to the new channel. Once the message is sent, the MDBS switches to the new channel. The subscribers must also switch, and because the timing of the channel switch is synchronized to the timing of the message commanding the switch, there is little overhead expended in the change so that data transmissions can quickly resume.

If the continuous CDPD mode is implemented in a way that it provides for dedicated channels, or for negotiation of channels with the AMPS equipment via the MD-IS, then hopping will not occur. If continuous CDPD channels are not assigned by negotiation with the AMPS equipment, then hopping is required. In this case, in the preferred embodiment of the invention, in the continuous CDPD mode, planned hops occur in the same manner as in the packet-switched mode. In particular, the MDBS sends a message to command a channel change, and the SNODEM in the base station and the subscriber both execute the change according to the same timing as in the packet-switched mode. When a forced hop occurs, in the preferred embodiment, the SNODEM executes the hop as in the packet-switched mode but transmits only empty data frames on the forward link until it receives good data on the reverse link. A time out allows the MDBS to decide that the subscriber connection has been permanently lost so that the channel may be released if necessary. When reverse channel data is detected, the connection has been re-established, and the MDBS begins to send frames filled with valid user data once again.

Alternatively, if a forced hop is required, the MDBS may terminate the connection, requiring a subscriber to revert to the packet mode and request a channel once again. This technique is not as efficient as the aforementioned approach to forced hops.

When a subscriber moves from one cell to another, a cell transfer is required in which the subscriber ceases communication with the current base station and initiates a new connection with another, more suitable base station. The means by which cell transfers occur for the packet mode are described in the CDPD specification previously incorporated into this application. In the continuous CDPD mode of operation, the same mechanisms are used for cell transfer, but when the subscriber begins communication with the new base station, the subscriber reverts to the packet mode of operation and once again requests a circuit-switched channel.

Figure 4:
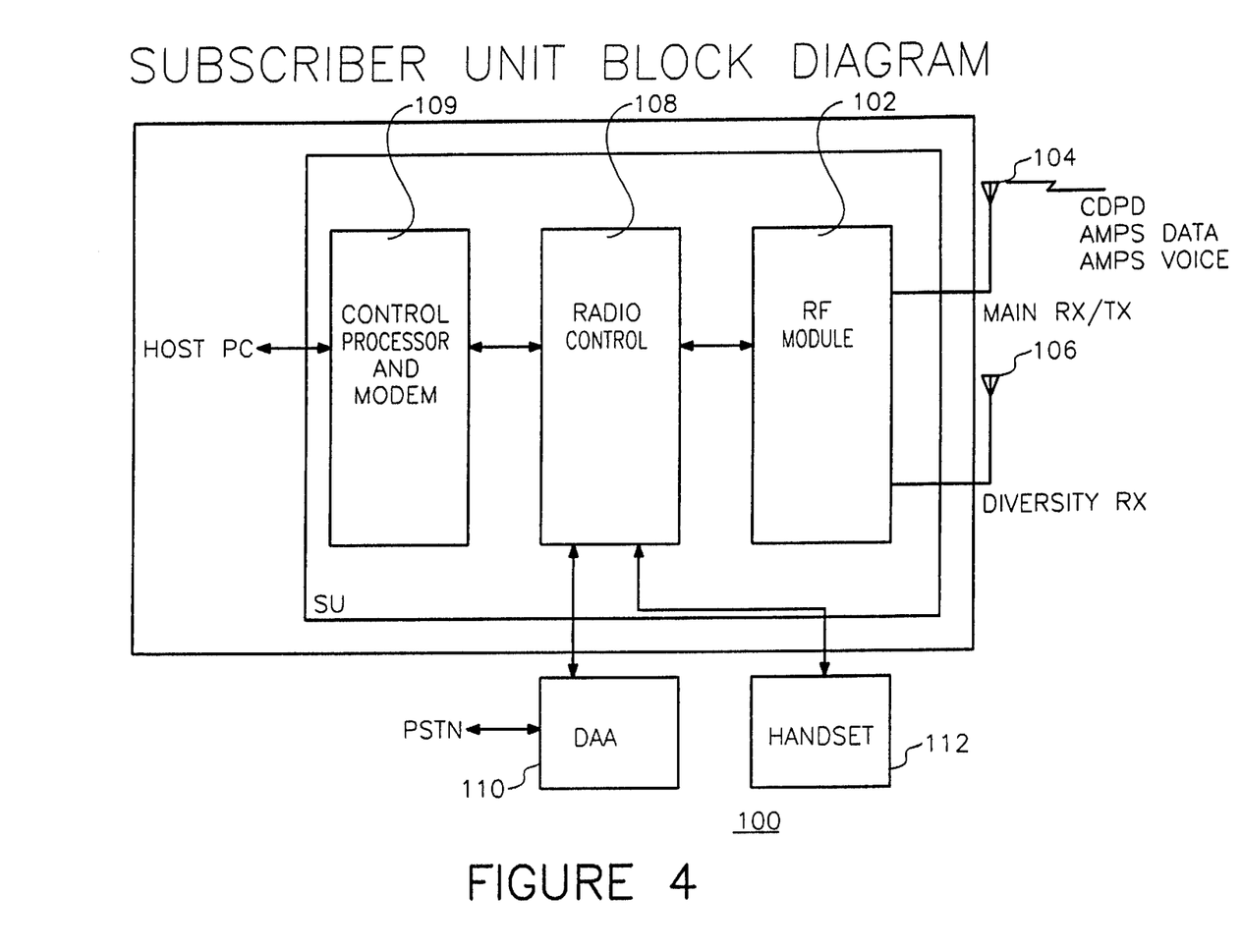
FIG. 4 is a block diagram of an end user station.

Normally, the request for a continuous CDPD channel will come from the mobile end station or subscriber unit as depicted in FIG. 4. The only change in a typical subscriber station supporting CDPD operation resides in the software that recognizes that a data file to be transmitted (or received) is more economically handled in the circuit-switched mode than in the packet-switched mode. In the alternative, subscriber may manually request the circuit-switched mode of transmission. The necessary modifications are best described with respect to the overall subscriber unit depicted in FIG. 4.

FIG. 4 is a block diagram of depicting an example of a portable communication terminal station or hand-set 100. Many other embodiments of subscriber units are possible, as long as they are capable of the functionality needed to support continuous CDPD operation, as previously described. In most respects this portable communication terminal is similar to conventional portable radio telephone hand-sets in that it includes a radio frequency module 102 having at least one radio frequency transceiver. In the subscriber unit of FIG. 4, the radio frequency transceiver is connected to a main antenna 104 for both receiving and transmitting, and to a diversity antenna 106 used for receiving when the signal quality on the diversity antenna is better than that on the main antenna due to channel conditions such as fading. Other embodiments of the described invention can make use of subscriber unit designs with different antenna configurations.

The subscriber design depicted in FIG. 4 has the capability of supporting AMPS cellular voice using handset 112. This design also has the capability of being connected to a local Public Switched Telephone Network (PSTN) via a digital-analog access interface 110. Neither of these capabilities are necessary for the implementation of either a packet-switched or a circuit-switched CDPD mode.

The controlled processor and modem section at 109 commands the radio control module to tune the RF module 102 to various candidate channels until an appropriate CDPD channel is found. Data transmissions from the base station are received and down converted by the RF module 102 and samples of the resulting waveform are passed by the radio control module 108 to the control processor and modem section 109. These samples are demodulated and the data present in the demodulated bit stream is extracted and routed to the host PC, or used internally by the control processor as appropriate. The control processor and modem section 109 receives data to be transmitted from the host PC and formats and transmits that data via the radio control module 108 and the RF module 102 according to CDPD protocols. The host computer can be a personal computer (PC), a personal digital assistant (PDA), or other source/destination device.

In the CDPD packet-switched mode, a cellular hand-set operates as a fully functional CDPD mobile terminal. In order to participate in the CDPD network, the hand-set communicates with a Mobile Data Base Station (MDBS) using GMSK modulation on AMPS radio frequencies and occupying one AMPS channel. Normally, the radio telephone hand-set will monitor received signal strength. Based upon the detected values, the hand-set will locate the strongest CDPD channel and register on that channel in the local cell. The hand-set will also locate and switch to a new CDPD channel whenever the local MDBS switches channels. If due to motion or other factors, the subscriber unit determines that another base station would provide a better connection, the subscriber station will establish the connection with that base station by carrying out a hand-off or cell transfer.

By using the CDPD mode as described above, the subject hand-set has the capability of sending data messages such as electronic mail to other destinations in various public and private networks. The subscriber unit can also be used to transport data (via electronic mail/page/FAX/file) to and from the host computer via an appropriate I/O port and the CDPD network. Since the hand-off sequence in the CDPD mode mitigates against data loss, as indicated in the CDPD specification, successful data transfer can take place even when the mobile data terminal is moving from one cell to another. While requests for the continuous CDPD mode of operation can be made manually by the user of a wireless subscriber station, the most efficient use of the system would be the operation of an automatic request initiated at the wireless subscriber station by the application layer software or by software at some other layer of the protocol stack. Even if the bulk of the data is to be sent on the forward link (from the MDBS to the subscribe station), the request would still come from the subscriber station. There are two ways in which this could be accomplished.

First, there could be knowledge at the subscriber station of the size of the transfer about to take place. For example, if the subscriber station is connected with a computer running a specific program or application, that program may already have advanced information as to the size of the data to be transferred. This is quite common since many programs handling data transfer provide an indication of the amount of data to be transferred.

Second, the sender of the data may know the amount of data to be transferred, so that some indication of the data amount could be sent to the mobile data base station and to the wireless subscriber station, which would initiate the request. An indication of the amount of data to be transferred is generally available with programs or applications designed for data transfer. Consequently, there are no special measures which must be taken to obtain an indication of the amount of data to be transferred. In either case, the subscriber station can then make the request for continuous CDPD operation. Knowledge of the size of data transfers is not required by the MDBS. The MDBS is responsible for receiving a request for a continuous CDPD connection, assigning a SNODEM card (if available) to the subscriber making the request, and informing the subscriber of the channel to which the continuous CDPD connection is assigned, and de-establishing the connection when the transaction is complete. Completion of the transaction may be determined by an end-of-transfer message from the subscriber, or by the absence of a reverse channel signal at the MDBS receiver input.

The only change to the MDBS to add the circuit-switched functionally resides in the additional SNODEM module 45'. The request for a continuous CDPD operation from subscriber stations are processed by control computer module 44.

There are a number of approaches for allocating a channel in response to a request for continuous CDPD communication. The first is the use of a pre-assigned and dedicated channel for CDPD circuit-switched use. One such channel would be assigned to each of the circuit-switched SNODEM module 45' in each MDBS. As soon as a request is received for continuous CDPD communication, controller 44 would automatically assign one of the unused SNODEM module 45' to the requesting subscriber. The MDBS would then address a switched channels command to the requesting subscriber station, directing that subscriber station to the assigned channel. Normal packet-switched CDPD communication would be barred from these dedicated channels using techniques explained, infra. Packet-switched CDPD subscribers will not contend for this channel because the forward channel format is incompatible with the packet mode. Thus, the CDPD packet-switched users cannot receive this channel.

In another approach, the request for continuous CDPD communication would be processed by controller board 44 in a normal fashion. However, modem board 45' would be programmed to use its sniffer (as fully described in U.S. patent application Ser. No. 08/152,005 now U.S. Pat. No. 5,544,222) to search for an unoccupied channel to be used by the requested circuit-switched transmission. As in the previous case, once the channel is assigned to continuous CDPD communication, the MDBS sends a switch channels command to the requesting subscriber station, directing that subscriber station to the assigned channel. While packet-switched CDPD subscribers will not contend for such a channel, AMPS communication can pre-empt the circuit-switched transmission in this case.

The selection of the open channel for a continuous CDPD communication by the sniffer on SNODEM module 45' can be conducted in the same way as is done to select a channel during a normal channel hopping routine as described in U.S. patent application Ser. No. 08/152,005 now U.S. Pat. No. 5,544,222. As previously described in the preferred embodiment of the invention, the continuous CDPD mode planned hops occur in the same manner as in the packet-switched mode. The MDBS sends a message to command a channel change, and the SNODEM in the base station, and the subscriber station both execute the change according to the same timing as in the packet- switched mode. When a forced hop occurs, in the preferred embodiment, the SNODEM executes the hop as in the packet-switched mode, but transmits only empty data frames on the forward link until it receives good data on the reverse link. A time-out allows the MDBS to decide that the subscriber connection has been permanently lost so that the channel may be released if necessary. When a reverse channel data is detected, the CDPD connection has been re-established and the MDBS begins to send frames filled with valid user data once again. Alternatively, if a forced hop is required, the MDBS may terminate the connection, requiring a subscriber station to revert to the packet mode and request a channel once again. This technique is not as efficient as the aforementioned approach to forced hops. Upon re-establishing CDPD packet-switched communication on a new channel, the subscriber must once again request continuous CDPD communication.

Figure 5:
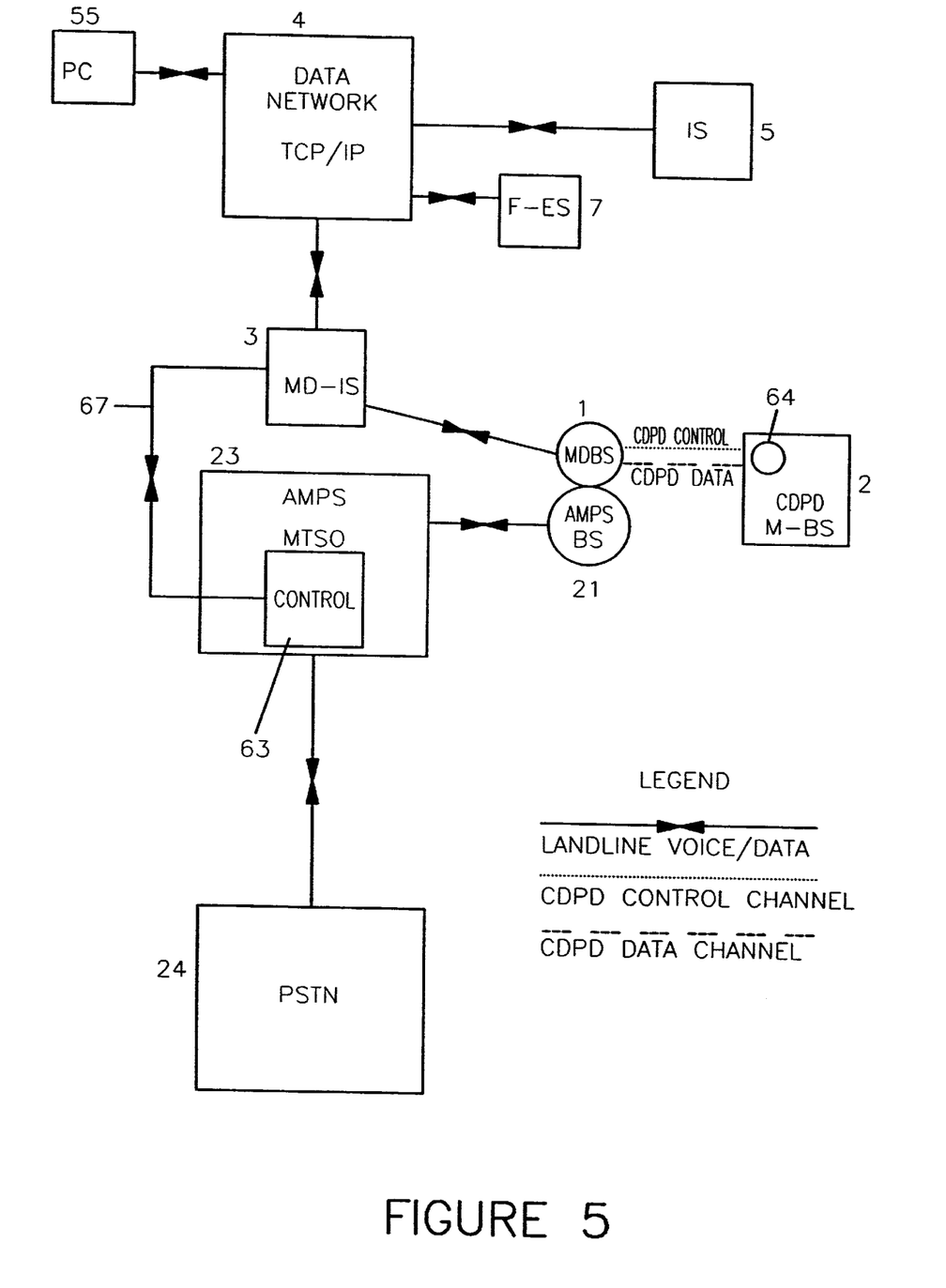
FIG. 5 is a block diagram depicting the correlation between the controllers for an AMPS system and a CDPD system.

A more complex but technically superior approach is facilitated by the block diagram of FIG. 5. An additional feature found in FIG. 5 is a data link 67 between MD-IS 3 which controls the CDPD system and MTSO 23 which controls the AMPS system. This data link permits communication between the MD-IS and the MTSO for the purpose of allowing the CDPD system to negotiate an AMPS channel to be used for continuous CDPD communication. This arrangement could be very useful in situations where there is a great deal of CDPD packet-switched use and no dedicated continuous CDPD channel has been allocated. Under such conditions, the RF sniffer of the dedicated SNODEM module 41' would have difficulty finding an open CDPD channel. However, a free channel could be found in the AMPS system by MTSO 23 and assigned for temporary CDPD use for the requested continuous CDPD communication. Under such conditions, once a channel has been assigned for continuous CDPD operation by MTSO 23, there would be no chance of the continuous CDPD communication being interrupted by AMPS communication since the channel would have been temporarily dedicated for CDPD use by the AMPS system controller.

There are a number of protocols that could be used to conduct the communication between MD-IS 3 and MTSO 23. Preferably, data link 67 can be a T1 line using, for example, .X25 protocol. However, other types of data links and protocols can be used.

The logic programmed into mobile end user/subscriber station 2 for requesting a circuit-switched channel utilizes control processor and modem 109 (in FIG. 4) in conjunction with radio control processor 108 (FIG. 4). When an automatic decision is made by the subscriber unit control processor programming to request the CDPD circuit-switched mode of operation, it is in response to a determination of the size of a data file to be transmitted by the subscriber unit or received by the subscriber unit. Normally such a transfer is carried out in conjunction with the use of the subscriber unit with a host PC or a Personal Digital Assistant (PDA). However, control processor 109 can contain sufficient programming to handle the transfer of data files, as well as a determination of data file size so that a request for a circuit-switched operation can be made. This is the most basic logic of controlling the request for a circuit-switched operation.

However, the determination of the file size at which the request for transfer is made is based upon the carrier costs for transmitting the data files. In general, carriers will charge for CDPD service on a per-packet basis, while circuit-switched service is charged based upon the connection time required to carry out data transmission. Thus, for a certain data file size, CDPD packet-switched is cheaper while for another data file size, circuit-switched operation is cheaper. Using the previously cited example, suppose that the circuit-switched rate is 40 cents per minute and the charges occur for one minute increments. This means that the least expensive circuit-switched connection cost is 40 cents. Assuming that the CDPD (packet-switched) rate is 5 cents per-packet, then the CDPD packet-switched mode is cheaper for eight data packets or less. This is approximately 2200 bits of data. Consequently, for these representative rates, the demarcation between preferred CDPD packet-switched operation and continuous CDPD operation is between 2 and 4 kbits. The logic for responding to the size of the file and carrier costs for the two modes of data transmission can be pre-programmed into a PDA or host PC operating in conjunction with the subscriber unit, as well as control processor 109.

Once a channel is allocated for continuous CDPD operation, CDPD packet-switched subscriber stations must be able to differentiate between the circuit-switched CDPD channel and a packet-switched channel so that they do not attempt to access the circuit-switched channel. Consequently, it is necessary that means be provided to make such access impossible during the extent of the continuous CDPD communication. The techniques for differentiation are best understood in view of the arrangement for standard CDPD packet-switched transmissions.

Normally, CDPD packet-switched channels are formulated with a block of 282 MDLP layer bits encoded with a (63,47) Reed Solomon code to create a 378 bit long block. This block is then covered (by XOR operation) with bits generated from the polynomial expressed as:

$$g(D)=D^9+D^8+D^5+D^4+1.$$

This is initialized with the binary value 111000101 at the start of each block. The process is illustrated in page 402–14 of the CDPD specification, Version 1.1. The block is then divided into seven segments of 54 bits which are separated by six bit control fields. Each control field consists of a single decode status flag bit indicating the success or failure of the error correction and detection decoding process applied to the previous block. The control field also consists of a 5 bit busy/idle status flag indicating whether the base station detected CDPD transmissions on the channel during the time since the previous busy/idle flag. Then the busy/idle flag is X0Red with 5 bits of a 35 bit sync word used to assist the subscriber in finding block synchronization. Each of the seven busy/idle flags in a block is X0Red with a different 5 bit segment of the 35 bit sync word. The sync word pattern is 11101 00001 11000 00100 11001 01010 01111. This process is more fully described on pages 402–12 through 402–21 of the CDPD specification, Version 1.1.

CDPD packet-switched subscriber units can only acquire the channel if the data fits the specified structure. The Reed Solomon decoding process is able to both correct errors in the received data blocks and to also indicate whether the decoded data contains uncorrectable errors. If blocks of data are received with uncorrectable errors on a particular channel, the subscriber station assumes that a usable packet-switched CDPD signal is not available, and searches other channels.

Based upon the aforementioned bit arrangement, a number of different techniques for distinguishing the standard packet-switched mode from the continuous CDPD mode of operation can be used. For example, a different code rate could be used for the continuous CDPD mode of operation. The code rate could be increased to get greater through put or more error correction as desired. Because a code rate of the circuit-switched mode is different from that of the packet-switched mode, the packet-switched CDPD subscriber will be unable to produce error-free decoded blocks, and will thus, determine that there is no usable packet-switched CDPD signal present. However, the code is not critical to be able to distinguish between the two modes of operation.

Another option is to vary the exact cover sequence used so that cover sequence for the continuous CDPD mode does not correlate to the packet-switched mode in CDPD operation. The exact difference is not important as long as the two modes of operation would not correlate well with each other. For example, the aforementioned generator polynomial could be the same for both modes of operation. However, different initializing values could be used for packet-switched operation and continuous CDPD operation.

Another approach is to vary the synch word structure. For example, the data block that results in the aforementioned XORing of the 378 code bits with the PN cover could be split into seven-54 bit. segments as in the packet-switched mode. However, the decode status flag is inserted only in between the 54 bit segments (here the function of the decode status flag is identical to that in the packet-switched mode). The resulting 385 bits could be preceded by a 15 bit sync word (for example, 0000 1100 1001 010). The 15 sync bit word would not be distributed across the data block but would have all 15 bits placed together. There would be no busy/idle function since this would not be necessary in the proposed arrangement. The result would be a complete data block 400 bits long as opposed to 420 bits in the packet-switched CDPD mode. Thus, the variation of the sync word to differ in length and in exact bits, as well as distribution across the data block could be the required distinction between the data block arrangement for the packet-switched mode and the circuit-switched mode of operation. It is not necessary that the sync word exist at all since it is possible to acquire synchronization by trying to decode different block alignments until one decodes successfully. If this process is used, a sync word is not necessary. However, the process takes longer than one using a sync word. It is also possible that the synchronization of the circuit-switched mode can depend upon the operation of the packet-switched channel. However, this is very difficult to do if the block lengths are not the same for the two.

Although a number of arrangements of the invention have been mentioned by way of example, it is not intended that the invention be limited thereto. For example, the invention can be adapted to use a variety of algorithms of scanning for candidate channels for continuous CDPD operation. Accordingly, this invention should be considered to include any and all configurations, modifications, variations, combinations or equivalent arrangements falling within the scope of the following claims.

We claim:

1. A communication system arranged to facilitate efficient data transmission, said communication system being constituted by a Cellular Digital Packet Data (CDPD) packet-switched portion, said CDPD packet-switched portion being arranged to facilitate communication for a plurality of wireless subscriber stations using a plurality of Mobile Data Base Stations (MDBS) controlled by at least one Mobile Data Intermediate System (MD-IS), said system further comprising:

(a) a continuous CDPD data portion distributed over a plurality of CDPD mobile data base stations;

(b) means for requesting conversion of a particular data transmission from said CDPD packet-switched portion to said continuous CDPD data portion; and (c) means for allocating a continuous CDPD channel for said particular data transmission.

2. A communication system of claim 1, wherein said means for requesting operates responsive to an amount of data in said particular data transmission.

3. The communication system of claim 2, wherein a request for conversion is initiated at a wireless subscriber station.

4. The communication system of claim 3, further comprising an analog cellular portion arranged to facilitate communication for a plurality of said wireless subscriber station using a plurality of base stations controlled by a Mobile Telephone Switching Office (MTSO).

5. The communication system of claim 4, wherein said analog cellular portion comprises an Advanced Mobile Phone Service (AMPS) system.

6. The communication system of claim 5, wherein said CDPD packet-switched portion comprises means for carrying out constant envelope modulation, and said continuous CDPD data portion comprise means for carrying out constant envelope modulation where both said means for carrying out constant envelope modulation are identical to each other.

7. The communication system of claim 6, wherein said continuous CDPD portion comprises at least one dedicated sniffer/modem/transceiver (SNODEM) module located in each said MDBS of said CDPD packet-switched portion.

8. The communication system of claim 7, wherein said dedicated SNODEM operates on a single assigned channel.

9. The communication system of claim 8, wherein data transmission on each said single assigned channel is not subject to pre-emption by CDPD packet-switched communication.

10. The communication system of claim 9, wherein said means for allocating comprise at least one said dedicated SNODEM and a controller board.

11. The communication system of claim 7, wherein said means for allocating comprise means for scanning for an available channel.

12. The communication system of claim 11, wherein said available channel is selected from among channels available for CDPD packet-switched use.

13. The communication system of claim 12, wherein said means for scanning is located at said dedicated SNODEM.

14. The communications system of claim 13, further comprising a second SNODEM where said first and second SNODEM comprise means for scanning.

15. The communication system of claim 14, wherein said first SNODEM observes forward channel activity of a cell containing said first SNODEM, and said second SNODEM observes reverse channel activity originating from other cells.

16. The communication system of claim 10, wherein said means for allocating further comprise said MD-IS.

17. The communication system of claim 7, wherein said means for allocating comprise said MD-IS, said MTSO and a data link therebetween.

18. The communication system of claim 17, wherein a channel allocated for continuous CDPD operation by said means for allocating is not subject to pre-emption by AMPS communication.

19. The communication system of claim 4, further comprising:
(d) means for distinguishing between CDPD packet data communication and continuous CDPD communication.

20. The communication system of claim 3, wherein said means for requesting conversion operates automatically.

21. The communication system of claim 20, wherein said means for requesting conversion further operate responsive to respective cost data of said CDPD packet data communication and continuous CDPD communication.

22. The communication system of claim 3, wherein said means for requesting conversion are operated manually by a user of a wireless subscriber station.

23. A method of efficient data transmission in a communication system, said communication system including a Cellular Digital Packet Data (CDPD) packet-switched portion, where said CDPD portion is arranged to facilitate communication with a plurality of wireless subscriber stations using a plurality of Mobile Data Base Stations (MDBS) controlled by a Mobile Data Intermediate Section (MD-IS); said method comprising the steps of:
(a) temporarily designating at least one CDPD packet-switched channel as a continuous CDPD channel not subject to use by CDPD packet-switched mode transmissions;
(b) requesting conversion of a particular data transmission from a CDPD packet-switched mode to a continuous CDPD mode; and
(c) transferring said particular data transmission to said designated continuous CDPD channel and carrying out said particular data transmission in said continuous CDPD mode.

24. The method of claim 23, wherein step (b) is carried out responsive to a determination of data amount in said particular data transmission.

25. The method of claim 24, wherein step (b) is further carried out responsive to a determination of respective cost of data transfer for said CDPD packet-switched mode and said continuous CDPD mode.

26. The method of claim 23, wherein step (b) is carried out automatically.

27. The method of claim 26, wherein step (b) is initiated at a wireless subscriber station.

28. The method of claim 23, further comprising:
(d) placing designations on said particular data transmission to distinguish said particular data transmission from CDPD packet-switched mode transmissions whereby a SNODEM operating in the packet-switched mode cannot receive data with uncorrectable transmission errors from a communication being carried out in said continuous CDPD mode.

29. The method of claim 28, wherein step (d) is carried out by placing a different cover sequence on said continuous CDPD data transmission than is used on said CDPD packet-switched mode transmissions.

30. The method of claim 29, wherein a sync word for said continuous CDPD mode data transmission differs from a sync word of a CDPD packet-switched mode transmission.

31. The method of claim 23, wherein step (c) comprises the sub-step of carrying out constant envelope modulation of said particular data transmission in said continuous CDPD mode.

32. The method of claim 31, wherein step (c) further comprises the sub-step of scanning channels available for packet-switched CDPD communication for an unused channel packet-switched channel for carrying out said particular data transmission in said continuous CDPD mode.

33. The method of claim 31, wherein step (c) comprises the sub-step of carrying out a negotiation between said MD-IS and a MTSO to select a channel dedicated to carrying out said particular data transmission in said continuous CDPD mode.

34. The method of claim 33, wherein said particular data transmission in said continuous CDPD mode is not subject to pre-emption by an AMPS communication.

35. A Cellular Digital Packet Data (CDPD), Mobile Data Base Stations (MDBS) comprising:
(a) a plurality of transceiver cards dedicated to CDPD packet-switched communication;
(b) at least one transceiver card allocated to continuous CDPD communication; and
(c) means for assigning a CDPD data communication to said transceiver card allocated to continuous CDPD data communication,
wherein said means for assigning comprise means for scanning among available CDPD packet-switched channels for a channel to be used as a continuous CDPD channel.

36. The CDPD MDBS of claim 35, wherein said at least one transceiver card includes an RF sniffer, at least one RF transceiver and a modem and said means for scanning comprise said RF sniffer.

37. The CDPD MDBS of claim 36, wherein said at least one transceiver card comprises a second RF sniffer and said second RF sniffer comprises said means for scanning.

38. The CDPD MDBS of claim 37, wherein said first RF sniffer observes forward channel activity of a cell containing said first RF sniffer, and said second RF sniffer observes reverse channel activity originating from other cells.

39. A portable wireless subscriber station comprising:
one or more first circuits permitting Cellular Digital Packet Data (CDPD) packet-switched mode of communications;
one or more second circuits permitting continuous CDPD mode of communications; and
a selection mechanism for selecting between said first and second circuits,
wherein said selection mechanism comprises a subscriber-actuated mechanism for switching between modes.

40. The portable wireless subscriber station of claim 39, wherein said selection mechanism comprise means for automatically determining an amount of data in a data file to be transmitted.

41. The portable wireless subscriber station of claim 40, wherein said selection mechanism further comprise means for correlating respective costs for data transmission in said CDPD packet-switched mode and said continuous CDPD mode.

42. The portable wireless subscriber station of claim 39, further comprising means for distinguishing data transmission in said CDPD packet-switched mode from data transmissions in said continuous CDPD mode.

* * * * *